US010543398B2

(12) United States Patent
Yang et al.

(10) Patent No.: US 10,543,398 B2
(45) Date of Patent: Jan. 28, 2020

(54) WIRELESS POSITIONING APPARATUS AND METHOD, AND SPORTS TRAINING APPARATUS

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Guilong Yang, Beijing (CN); Miao Liu, Beijing (CN); Feng Bai, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/741,289

(22) PCT Filed: May 23, 2017

(86) PCT No.: PCT/CN2017/085497
§ 371 (c)(1),
(2) Date: Jan. 1, 2018

(87) PCT Pub. No.: WO2017/206764
PCT Pub. Date: Dec. 7, 2017

(65) Prior Publication Data
US 2019/0076698 A1 Mar. 14, 2019

(30) Foreign Application Priority Data
Jun. 1, 2016 (CN) .......................... 2016 1 0383394

(51) Int. Cl.
*A63B 24/00* (2006.01)
*H04B 17/318* (2015.01)
(Continued)

(52) U.S. Cl.
CPC ...... *A63B 24/0062* (2013.01); *A63B 24/0021* (2013.01); *G06F 1/163* (2013.01);
(Continued)

(58) Field of Classification Search
CPC ....... A63B 24/0021; A63B 2024/0025; H04W 4/023; G06F 1/163; G01S 5/14
(Continued)

(56) References Cited

U.S. PATENT DOCUMENTS 7,671,802 B2 3/2010 Walsh et al.
2009/0231198 A1* 9/2009 Walsh ................ A63B 24/0021
342/463

(Continued)

FOREIGN PATENT DOCUMENTS

CN 104144005 A 11/2014
CN 203916021 U 11/2014
(Continued)

OTHER PUBLICATIONS

International Search Report and Written Opinion dated Aug. 25, 2017 in PCT/CN2017/085497.
(Continued)

*Primary Examiner* — Ayodeji O Ayotunde
(74) *Attorney, Agent, or Firm* — Syncoda LLC; Feng Ma

(57) ABSTRACT

A wireless positioning apparatus is disclosed, which includes at least one first device and at least one second device. Each first device is disposed on each moving object and is configured to transmit a wireless signal. Each second device is disposed on a fixed position and is configured to detect a strength of the wireless signal of each first device. The wireless positioning apparatus further includes a data processor, which is configured to receive the strength of the wireless signal of each first device detected by each second device, to calculate a distance between each first device and
(Continued)

each second device, and to ultimately determine a position of each first device to thereby realize the positioning of each moving object. A wireless positioning method and a sports training apparatus comprising the wireless positioning apparatus are also provided in the disclosure.

16 Claims, 5 Drawing Sheets

(51) Int. Cl.
*H04W 4/80* (2018.01)
*G06F 1/16* (2006.01)
*G06F 17/11* (2006.01)
*H04W 4/02* (2018.01)

(52) U.S. Cl.
CPC ........... *G06F 17/11* (2013.01); *H04B 17/318* (2015.01); *H04W 4/023* (2013.01); *H04W 4/80* (2018.02); *A63B 2024/0025* (2013.01); *A63B 2024/0056* (2013.01)

(58) Field of Classification Search
USPC ............................................ 455/456.1, 456.3
See application file for complete search history.

(56) References Cited

U.S. PATENT DOCUMENTS

| | | | | |
|---|---|---|---|---|
| 2009/0280824 | A1* | 11/2009 | Rautiainen | ................ G01S 5/14 |
| | | | | 455/456.1 |
| 2011/0205077 | A1* | 8/2011 | Cavallaro | .......... A63B 24/0021 |
| | | | | 340/686.6 |

FOREIGN PATENT DOCUMENTS

| | | |
|---|---|---|
| CN | 204319705 U | 5/2015 |
| CN | 204319729 U | 5/2015 |
| CN | 104678355 A | 6/2015 |
| CN | 105072581 A | 11/2015 |
| CN | 105093177 A | 11/2015 |
| CN | 105223549 A | 1/2016 |

OTHER PUBLICATIONS

1st Office Action dated Mar. 10, 2017 in CN201610383394.2.
Xiang, et al., Monitoring System of Soccer Positioning Based on Zigbee Technology, J. Jilin Univ. (Information Science Edition), 1671-5896 (2013_05-0477-06; Sep. 2013, Jilin, China.

* cited by examiner

WIRELESS POSITIONING APPARATUS AND METHOD, AND SPORTS TRAINING APPARATUS

CROSS-REFERENCE TO RELATED APPLICATION

The present application claims priority to Chinese Patent Application No. 201610383394.2 filed on Jun. 1, 2016, the disclosure of which is hereby incorporated by reference in its entirety.

TECHNICAL FIELD

The present disclosure relates generally to the technologies of telecommunication, and more specifically to a wireless positioning apparatus and a sports training apparatus.

BACKGROUND

During athletics training, if real-time positioning of each athletic can be realized, characteristics of movements of each athletic can be determined and analyzed. Based on the information as such, coaches can provide each athletic with a personalized training according to the characteristics of movements for each individual athletic. As such, a refined management for each athletic can be achieved, leading to saving of efforts and achieving better results in the improvement of specialized skills of the athletics.

Given the above, how to realize real-time positioning for each athletic is a technical issue during the process of athletics training that needs to be addressed.

SUMMARY

In view of the above mentioned issue, the present disclosure provides a wireless positioning apparatus and method, and a sports training apparatus, which allow real-time positioning of each athletic during the process of training athletics.

In a first aspect, the present disclosure provides a wireless positioning apparatus. The wireless positioning apparatus can be employed to position at least one moving object, such as players in a soccer field. The wireless positioning apparatus includes at least one first device and at least one second device.

Each of the at least one first device is disposed on each of the at least one moving object and is configured to transmit a wireless signal. Each of at least one to second device is disposed on a fixed position and is configured to detect a strength of the wireless signal of each first device such that a position of the each of the at least one moving object can be determined based on the strength of the wireless signal of each first device detected by each second device.

Herein each of the at least one first device can be a sensor, and each of the at least one second device can be a data collector.

The wireless positioning apparatus can further include a data processor, which is configured to receive the strength of the wireless signal of each first device from each second device; to calculate a distance between each first device and each second device based on the strength of the wireless signal of each first device detected by each second device; and is also configured to determine a position of each first device based on the distance between each first device and each second device to thereby position the each of the at least one moving object.

In some embodiments of the wireless positioning apparatus, the data processor is configured to calculate a distance between each first device and each second device based on formula:

$$D_{nm} = 10^{\frac{|RSSI_{nm}|-A_{nm}}{10 \times K_{nm}}};$$

wherein $D_{nm}$ represents a distance between $n^{th}$ first device and $m^{th}$ second device; $RSSI_{nm}$ represents a strength of a wireless signal of the $n^{th}$ first device detected by the $m^{th}$ second device; $A_{nm}$ represents a strength of a wireless signal of the $n^{th}$ first device detected by the $m^{th}$ second device at a preselected distance between the $n^{th}$ first device and the $m^{th}$ second device; and $K_{nm}$ represents an environment calibration parameter for a first device and second device pair including the $m^{th}$ second device and the $n^{th}$ first device.

In these embodiments of the wireless positioning apparatus as described above, the data processor is configured to store an environment calibration parameter for each first device and second device pair including each second device and each first device. The environment calibration parameter for each first device and second device pair is calculated by formula:

$$K_{nm} = \frac{|RSSI_{nm}|-A_{nm}}{10 \times lgd_{nm}};$$

wherein $d_{nm}$ represents a distance between the $n^{th}$ first device and the $m^{th}$ second device when the $n^{th}$ first device is disposed at the preselected position; $RSSI_{nm}$ represents a strength of a wireless signal of the $n^{th}$ first device detected by the $m^{th}$ second device at the distance of $d_{nm}$ between the $n^{th}$ first device and the $m^{th}$ second device; $A_{nm}$ represents a strength of a wireless signal of the $n^{th}$ first device detected by the $m^{th}$ second device at the preselected distance between the $n^{th}$ first device and the $m^{th}$ second device.

In some embodiments of the wireless positioning apparatus, each of the at least one first device is configured to transmit a bluetooth signal; and correspondingly, each of the at least one second device is configured to detect a strength of the bluetooth signal. Herein it is noted that other modes of wireless signal transmission, such as WI-FI, cellular signal, can also be possible.

Each of the at least one first device can be configured to transmit a bluetooth signal via a mode of bluetooth broadcasting. Other mode of bluetooth signal transmission is also possible.

Each of the at least one first device can be configured to transmit a bluetooth signal at a time interval of around 0.1 s according to some embodiments of the wireless positioning apparatus, and the time interval can also be adjusted based on practical needs. There are no limitations herein.

In some embodiments of the wireless positioning apparatus, the data processor is configured to receive the strength of the wireless signal of each first device from each second device via a mode of WI-FI.

In a second aspect, the present disclosure further provides a method for positioning at least one moving object. The method includes the following steps:

providing at least one first device disposed on each of the at least one moving object and transmitting a wireless signal, and at least one second device disposed at a fixed position and detecting a strength of the wireless signal of each first device;

calculating a distance between each first device and each second device based on the strength of the wireless signal of each first device; and positioning each of the at least one moving object based on the distance between each first device and each second device.

According to some embodiments, the step of calculating a distance between each first device and each second device based on the strength of the wireless signal of each first device is based on formula:

$$D_{nm} = 10^{\frac{|RSSI_{nm}|-A_{nm}}{10 \times K_{nm}}};$$

wherein $D_{nm}$ represents a distance between $n^{th}$ first device and $m^{th}$ second device; $RSSI_{nm}$ represents a strength of a wireless signal of the $n^{th}$ first device detected by the $m^{th}$ second device; $A_{nm}$ represents a strength of a wireless signal of the $n^{th}$ first device detected by the $m^{th}$ second device at a preselected distance between the $n^{th}$ first device and the $m^{th}$ second device; and $K_{nm}$ represents an environment calibration parameter for a first device and second device pair including the $m^{th}$ second device and the $n^{th}$ first device.

According to some embodiments of the present disclosure, prior to the step of calculating a distance between each first device and each second device based on the strength of the wireless signal of each first device, the method further includes a step of:

determining an environment calibration parameter for each first device and second device pair including each second device and each first device.

The above step of determining an environment calibration parameter for each first device and second device pair including each second device and each first device includes the following sub-steps:

disposing each first device at a preselected position;

detecting a strength of a wireless signal of each first device detected by each second device; and calculating a first environment calibration parameter for each first device and second device pair by formula:

$$K_{nm} = \frac{|RSSI_{nm}|-A_{nm}}{10 \times lgd_{nm}};$$

wherein $d_{nm}$ represents a distance between the $n^{th}$ first device and the $m^{th}$ second device when the $n^{th}$ first device is disposed at the preselected position; $RSSI_{nm}$ represents a strength of a wireless signal of the $n^{th}$ first device detected by the $m^{th}$ second device at the distance of d between the $n^{th}$ first device and the $m^{th}$ second device; $A_{nm}$ represents a strength of a wireless signal of the $n^{th}$ first device detected by the $m^{th}$ second device at the preselected distance between the $n^{th}$ first device and the $m^{th}$ second device.

In some embodiments of the method, the sub-step of determining an environment calibration parameter for each first device and second device pair including each second device and each first device further includes:

disposing each first device at at least one second preselected position, detecting a strength of a wireless signal of each first device disposed at each of the at least one second preselected position that is detected by each second device, and calculating at least one second environment calibration parameter for each first device and second device pair; and calculating an average value of the first environment calibration parameter and the at least one second environment calibration parameter to thereby obtain the environment calibration parameter.

In some embodiments of the method, the at least one second device includes a first set of three second devices, and as such the step of positioning each of the at least one moving object based on the distance between each first device and each second device comprises the following sub-step:

determining first coordinates of the each of the at least one moving object based on a distance calculated between each first device and each second device in the first set of three second devices.

The at least one second device can further includes at least one second set of three second devices, and as such, the step of positioning each of the at least one moving object based on the distance between each first device and each second device further includes the following sub-steps:

determining at least one second coordinates of the each of the at least one moving object based on a distance calculated between each first device and each second device in each of the at least one second set of three second devices; and calculating an average value of the first coordinates and the at least one second coordinates to thereby obtain a position of the each of the at least one moving object.

In some embodiments of the method, the wireless signal is a bluetooth signal. It is possible that each first device transmits a wireless signal via a mode of bluetooth broadcasting.

According to some embodiments of the method, the at least one moving object comprises at least one human, and the method further comprises the following steps:

calculating a first movement distance of each of the at least one human within a preselected time interval by formula: $L_1 = \int_0^T F(S[X,Y],t)dt$, wherein $L_1$ represents a first movement distance of one human; $S[X, Y]$ represents coordinates of the one human; $F(S[X, Y], t)$ represents a function of a movement track of the one human; and T represents the preselected time interval;

calculating a second movement distance of each of the at least one human within a preselected time interval by formula: $L_2 = N \times M$, wherein $L_2$ represents a second movement distance of one human; N represents a number of steps the one human moves within the preselected time interval T; and M represents an average stride distance of the one human; and adjusting the environment calibration parameter for each first device and second device pair by comparing the first movement distance and the second movement distance of each of the at least one human.

In a third aspect, the present disclosure further provides a sports training apparatus, which includes a wireless positioning apparatus according to any of the embodiments as described above.

In the sports training apparatus, each of at least one first device can be a wearable device worn on a body of a user.

In the sports training apparatus as described above, the data processor can be further configured to determine at least one of an instant speed, an average speed, a maximum speed, a number of sprints, and a first movement distance within a preselected time interval, of the user.

In the sports training apparatus as described above, each first device can be further configured to measure a number of steps of the user within the preselected time interval. Each second device can be further configured to receive, and send to the data processor, the number of steps within the preselected time interval sent by each first device.

Accordingly, the data processor can be further configured to determine a second movement distance within the preselected time interval based on the number of steps within the preselected time interval and an average stride distance, and to adjust the environment calibration parameter for each first device and second device pair including each second device and each first device by comparing the first movement distance and the second movement distance.

In any of the embodiments of the sports training apparatus, the user can be an athletic, but can also be a non-athletic person receiving sports training.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way. It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

In a first aspect, the present disclosure provides a wireless positioning apparatus.

Figure 1:
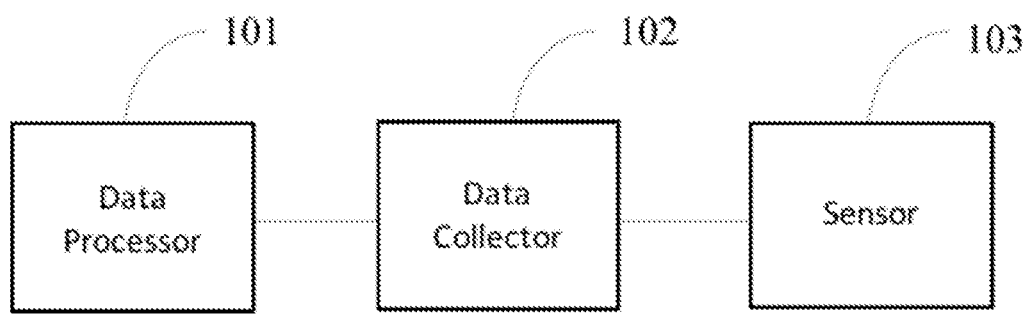
FIG. 1 is a structural diagram of a wireless positioning apparatus according to some embodiments of the present disclosure.

According to some embodiments of the present disclosure as shown in FIG. 1, the wireless positioning apparatus comprises: a data processor 101, at least one data collector 102, and at least one sensor 103. It is noted that for simplicity, only one sensor and only one data collector is shown in FIG. 1.

Each sensor 103 is configured to transmit a wireless signal to each data collector 102;

Each data collector 102 is configured to collect, and to send to the data processor 101, a strength of the wireless signal transmitted from each sensor 103;

The data processor 101 is configured to receive the strength of the wireless signal of each sensor 103 sent by each data collector 102, to calculate a distance between each sensor 103 and each data collector 102 based on the strength of the wireless signal of each sensor 103, and to position each sensor 103 according to the distance between each sensor 103 and each data collector 102.

The wireless positioning apparatus as described above can be utilized in many fields that are in need of positioning. For example, when the wireless positioning apparatus as described above is utilized in the sports field, each athletic can wear a sensor to thereby realize a real-time positioning of each athletic. In turn, the movement characteristics of each athletic can be determined, and individualized training can thus be provided to each athletic based on the movement characteristics of each athletic. Consequently, a refined management of each athletic can be achieved, leading to a saving of training efforts and an improvement of training results.

The wireless positioning apparatus as described above can be utilized in various different fields of sports such as football, soccer, basketball, and tennis, etc. An illustrating example in the field of soccer utilizing the wireless positioning apparatus as described above is provided in the following. It is of note that utilization of the wireless positioning apparatus in other fields of sports is similar to that in the field of soccer, and the description thereof is skipped herein.

During implementation, in the wireless positioning apparatus as described above, the data processor can specifically be configured to calculate a distance between each sensor and each data collector based on the following formula:

$$D_{nm} = 10^{\frac{|RSSI_{nm}| - A_{nm}}{10 \times K_{nm}}};$$

Herein $D_{nm}$ represents a distance between the $n^{th}$ sensor and the $m^{th}$ data collector; $RSSI_{nm}$ represents a strength of the wireless signal of the $n^{th}$ sensor collected by the $m^{th}$ data collector; $A_{nm}$ represents a strength of the wireless signal of the $n^{th}$ sensor collected by the $m^{th}$ data collector when and if the distance between the $n^{th}$ sensor and the $m^{th}$ data collector is equal to a preselected distance; and $K_{nm}$ represents a pre-stored environment calibration parameter for the sensor and data collector pair including the $m^{th}$ data collector and the $n^{th}$ sensor.

Specifically, when the wireless positioning apparatus as described above is utilized in practice, the environment calibration parameter for each sensor and data collector pair needs to be first determined and then stored in the data processor. As such, when the wireless positioning apparatus is utilized in soccer training, the data processor can calculate the distance between each sensor and each data collector based on the pre-stored environment calibration parameter for each sensor and data collector pair and on the aforementioned formula.

In practice, in the wireless positioning apparatus as described above, the data processor can further calculate, and store, the value of $K_{nm}$ according to the following formula:

$$K_{nm} = \frac{|RSSI_{nm}| - A_{nm}}{10 \times lgd_{nm}};$$

Herein $RSSI_{nm}$ represents a strength of the wireless signal of the $n^{th}$ sensor collected by the $m^{th}$ data collector when the distance between the $n^{th}$ sensor and the $m^{th}$ data collector is $d_{nm}$; $d_{nm}$ represents a distance between the $n^{th}$ sensor and the $m^{th}$ data collector when the $n^{th}$ sensor is disposed at a preselected position; $A_{nm}$ represents a strength of the wireless signal of the $n^{th}$ sensor collected by the $m^{th}$ data collector when the distance between the $n^{th}$ sensor and the $m^{th}$ data collector is equal to the preselected distance.

When the wireless positioning apparatus as described above is utilized in soccer training, the preselected position can be any fixed position in the soccer field, and there are no limitations herein.

In the wireless positioning apparatus as described above, the preselected distance can be set as 1 m, i.e., $A_{nm}$ represents the strength of the wireless signal of the $n^{th}$ sensor collected by the $m^{th}$ data collector when the distance between the $n^{th}$ sensor and the $m^{th}$ data collector is 1 m. It is noted that the preselected distance can be adjusted based on actual situations. There are no limitations herein.

The following is a detailed description of the process for determining the value of $K_{nm}$.

Figure 2:
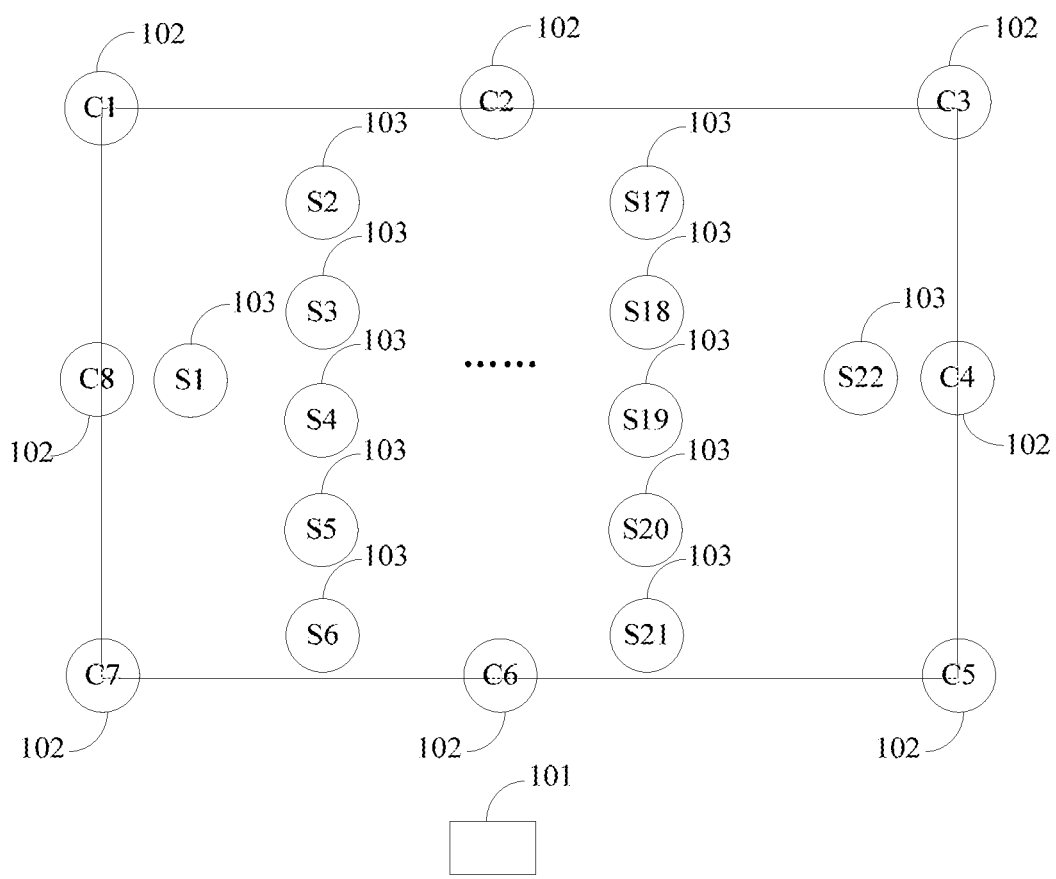
FIG. 2 is a schematic diagram illustrating a wireless positioning apparatus being utilized in sports training according to some embodiments of the present disclosure.

As shown in FIG. 2, eight data collectors 102, which are numbered C1-C8, can be set up surrounding the soccer field. Among these eight data collectors 102, C1, C3, C5 and C7 are respectively disposed at the four corners of the soccer field, C2 and C6 are respectively disposed at a center point of a longer side of the soccer field, and C4 and C8 are respectively disposed at a center point of a shorter side of the soccer field.

Each of the eight data collectors 102 can be arranged to have a same distance to the ground of the soccer field, and thus these eight data collectors 102 are substantially on a same plane parallel to the ground surface. Such a configuration can increase the accuracy in positioning.

Twenty two soccer players under training in the soccer field each wears one sensor 103, and the twenty two sensors 102 are numbered S1-S22. One data processor 101 is disposed outside the soccer field.

Specifically, a suitable number of data collectors can be disposed at a surrounding region of the field depending on the type of sports the wireless positioning apparatus is utilized in. There are no limitations herein.

With the sensor S1 as an example, the following is a detailed description of the process for determining the environment calibration parameters $K_{11}$, $K_{12}$, $K_{13}$, $K_{14}$, $K_{15}$, $K_{16}$, $K_{17}$, and $K_{18}$ for each sensor and data collector pair including the sensor C1 and each of the data collectors C1-C8 respectively.

Figure 3:
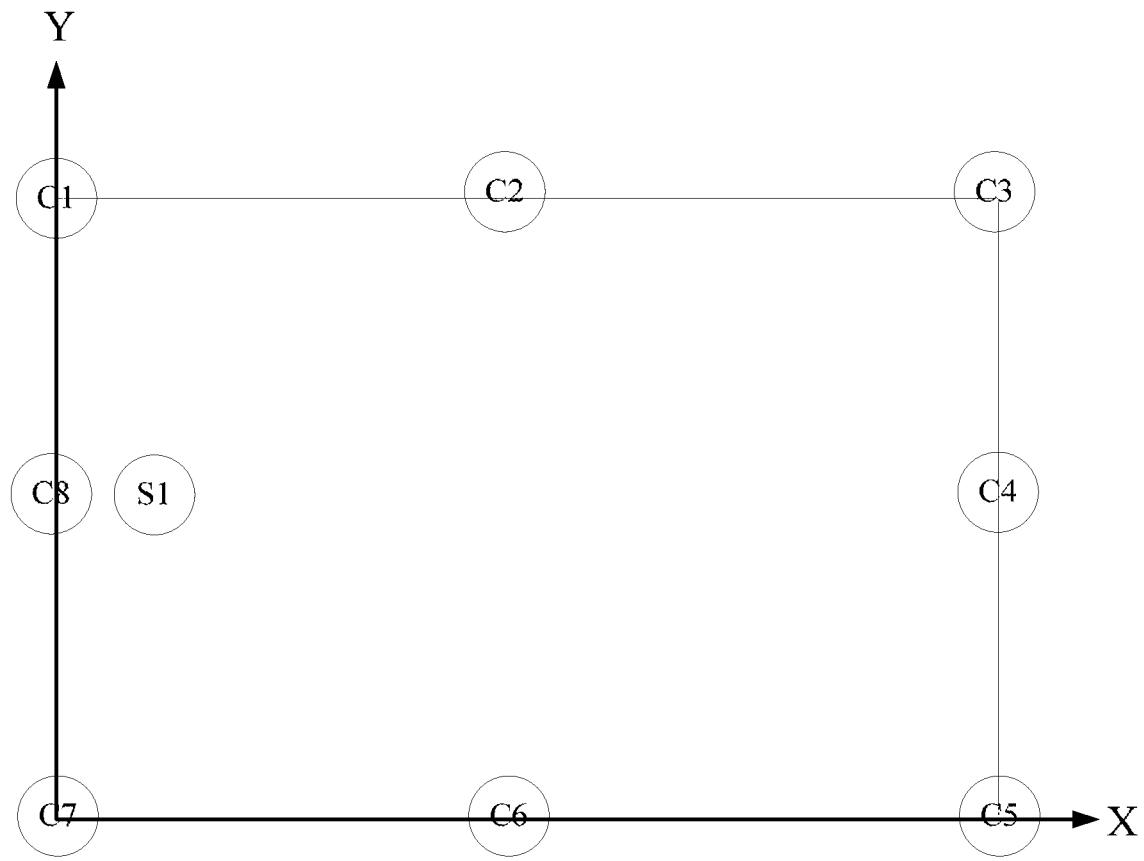
FIG. 3 is a schematic diagram illustrating the establishment of coordinate apparatus when the wireless positioning apparatus according to some embodiments of the present disclosure is utilized in sports training.

As shown in FIG. 3, a coordinate system for the soccer field is established, the length of the soccer field is L, and the width of the soccer field is W. The coordinates of the eight data collectors C1-C8 are shown in Table 1. The sensor S1 can be at any fixed position in the soccer field. In the following, an illustrating example is provided with the sensor S1 disposed at a position having a distance of 1 m with the data collector C8.

In order to simplify the calculation process, the distance between the sensor S1 and the data collector C8 can be ignored, then:

the distance between the sensor S1 and the data collector C1

$$d_{11} = \frac{W}{2};$$

the distance between the sensor S1 and the data collector C2

$$d_{12} = \sqrt{\left(\frac{W}{2}\right)^2 + \left(\frac{L}{2}\right)^2};$$

the distance between the sensor S1 and the data collector C3

$$d_{13} = \sqrt{\left(\frac{W}{2}\right)^2 + L^2};$$

the distance between the sensor S1 and the data collector C4 $d_{14}=L$;

the distance between the sensor S1 and data collector C5

$$d_{15} = \sqrt{\left(\frac{W}{2}\right)^2 + L^2};$$

the distance between the sensor S1 and data collector C6

$$d_{16} = \sqrt{\left(\frac{W}{2}\right)^2 + \left(\frac{L}{2}\right)^2};$$

and the distance between the sensor S1 and the data collector C7

$$d_{17} = \frac{W}{2}.$$

The values of d11-d17 are fed into the formula $$K_{nm} = \frac{|RSSI_{nm}| - A_{nm}}{10 \times lgd_{nm}},$$

TABLE 1

| C1 | C2 | C3 | C4 | C5 | C6 | C7 | C8 |
|---|---|---|---|---|---|---|---|
| (0, W) | $\left(\frac{L}{2}, W\right)$ | (L, W) | $\left(L, \frac{W}{2}\right)$ | (L, 0) | $\left(\frac{L}{2}, 0\right)$ | (0, 0) | $\left(0, \frac{W}{2}\right)$ | then the environment calibration parameter K11-K17 for each sensor and data collector pair including the sensor S1 and each of the data collectors C1-C7 can be obtained as following:

$$K_{11} = \frac{|RSSI_{11}| - A_{11}}{10 \times lg\frac{W}{2}},$$

$$K_{12} = \frac{|RSSI_{12}| - A_{12}}{10 \times lg\sqrt{\left(\frac{W}{2}\right)^2 + \left(\frac{L}{2}\right)^2}},$$

$$K_{13} = \frac{|RSSI_{13}| - A_{13}}{10 \times lg\sqrt{\left(\frac{W}{2}\right)^2 + L^2}},$$

$$K_{14} = \frac{|RSSI_{14}| - A_{14}}{10 \times lgL},$$

$$K_{15} = \frac{|RSSI_{15}| - A_{15}}{10 \times lg\sqrt{\left(\frac{W}{2}\right)^2 + L^2}},$$

$$K_{16} = \frac{|RSSI_{16}| - A_{16}}{10 \times lg\sqrt{\left(\frac{W}{2}\right)^2 + \left(\frac{L}{2}\right)^2}},$$

$$K_{17} = \frac{|RSSI_{17}| - A_{17}}{10 \times lg\frac{W}{2}}.$$

Here $RSSI_{18}$ is the strength of the wireless signal of the sensor S1 collected by the data collector C8 when the distance between the sensor S1 and data collector C8 is 1 m, which is equal to $A_{18}$. As thus, it can be obtained that $K_{18}=0$, which represents an invalid value.

As such, the value of $K_{18}$ can be calculated by placing the sensor S1 at a position having a distance of 1 m with any one of the data collectors C1-C7. The calculation process is substantially identical to the above mentioned process, and thus will be skipped herein. In a similar manner, the environment calibration parameters for each sensor and data collector pair including each of the sensors S2-S22 and each of the data collectors C1-C8 can be calculated.

In the wireless positioning apparatus as described above, the data processor can be configured to repeatedly calculate the values of $K_{nm}$ and then store an average value of $K_{nm}$ based on each of the values of $K_{nm}$ that has been calculated. For example:

The sensor S1 can be placed at a position having a distance of 1 m with the data collector C1 to calculate the environment calibration parameters for each sensor and data collector pair including the sensor S1 and each of the data collectors C2-C8;

The sensor S1 can be placed at a position having a distance of 1 m with the data collector C2 to calculate the environment calibration parameters for each sensor and data collector pair including the sensor S1 and each of the data collectors C1, C3-C8;

The sensor S1 can be placed at a position having a distance of 1 m with the data collector C3 to calculate the environment calibration parameters for each sensor and data collector pair including the sensor S1 and each of the data collectors C1, C2, C4-C8;

These above processes can go on until multiple values of $K_{11}$ are obtained, which can then be summed up and an average value can be calculated as the environment calibration parameter for the sensor and data collector pair including the sensor S1 and the data collector C1.

In a similar way, multiple values of $K_{12}$ can be calculated and summed up to thereby obtain an average value, which can be the environment calibration parameter for the sensor and data collector pair including the sensor S1 and the data collector C2; and so on.

As such, by using the average value of the multiple values of $K_{nm}$ as the environment calibration parameter for the sensor and data collector pair including the $n^{th}$ sensor and the $m^{th}$ data collector, and by further using the average value of $K_{nm}$ to calculate the distance between the $n^{th}$ sensor and the $m^{th}$ data collector, the accuracy in calculating the distance between the $n^{th}$ sensor and the $m^{th}$ data collector can be improved.

According to some embodiments of the present disclosure, the wireless positioning apparatus can comprise at least three data collectors, and the data processor can be configured to determine the coordinates of each sensor based on the distance between each sensor and each of the at least three data collectors and the coordinates of each of the at least three data collectors.

Figure 4:
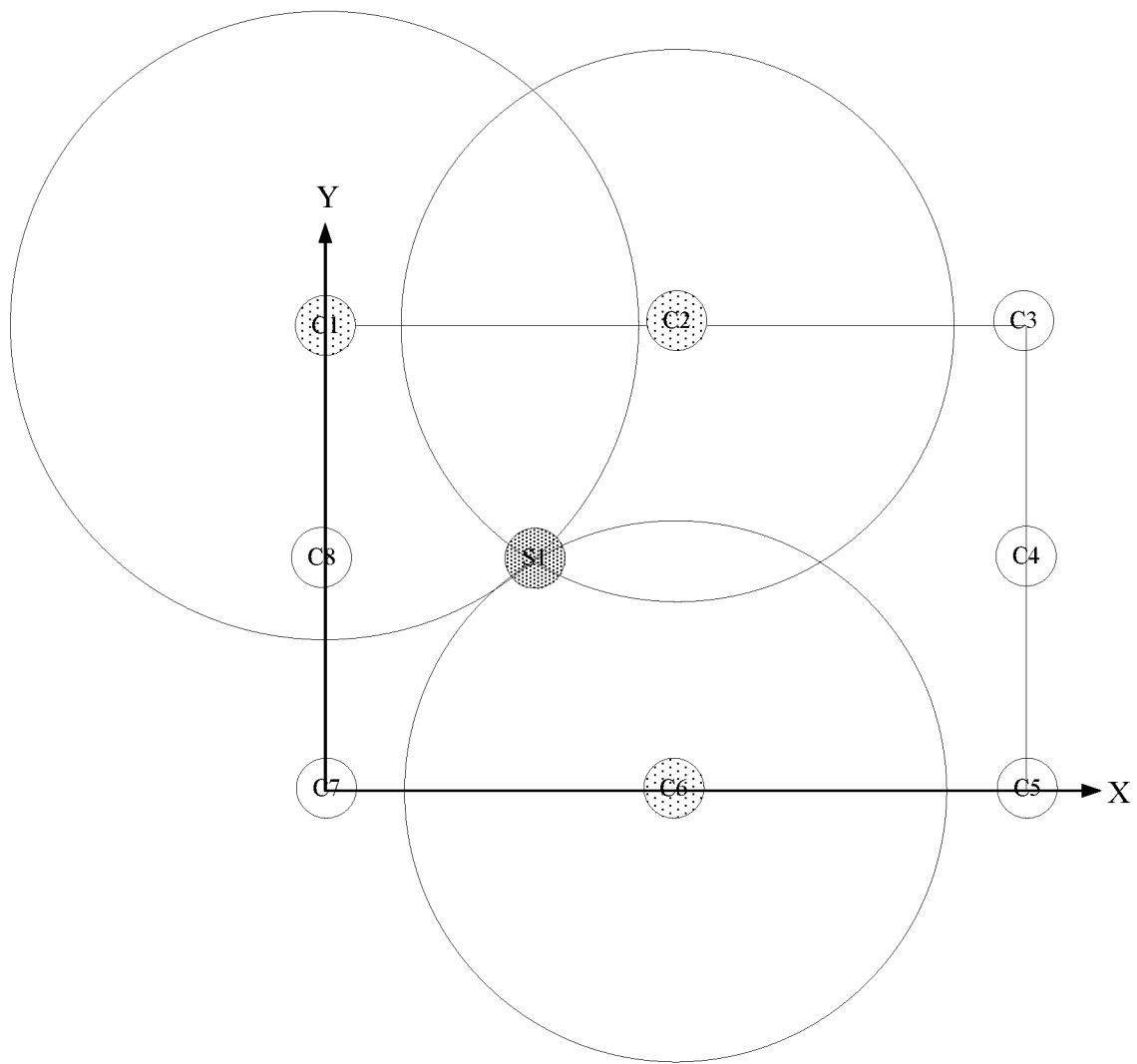
FIG. 4 is a schematic diagram illustrating the determination of the coordinates of sensors when the wireless positioning apparatus according to some embodiments of the present disclosure is utilized in sports training.

In one example as shown in FIG. 4, three data collectors C1, C2 and C6 are selected. Based on the Pythagorean theorem, the relationship among the distance $D_{11}$ between the sensor S1 and the data collector C1, the coordinates of the data collector C1 (0, W), and the coordinates of the sensor S1 (X, Y) shall satisfy the following formula:

$$X^2 + (W-Y)^2 = D_{11}^2.$$

Similarly, the relationship between the distance $D_{12}$ between the sensor S1 and the data collector C2, the coordinates of the data collector C2

$$\left(\frac{L}{2}, W\right),$$

and the coordinates of the sensor S1(X,Y) shall satisfy the formula:

$$\left(\frac{L}{2} - X\right)^2 + (W - Y)^2 = D_{12}^2.$$

Similarly, the distance $D_{16}$ between the sensor S1 and the data collector C6, the coordinate of the data collector C6

$$\left(\frac{L}{2}, 0\right),$$

and the coordinate of the sensor S1 (X,Y) shall satisfy the formula $$\left(\frac{L}{2} - X\right)^2 + Y^2 = D_{13}^2.$$

Because the circle with the data collector C1 as the center and the distance $D_{11}$ between the sensor S1 and the data collector C1 as the radius, the circle with the data collector C2 as the center and the distance $D_{12}$ between the sensor S1 and the data collector C2 as the radius, and the circle with the data collector C6 as the center and the distance $D_{16}$ between the sensor S1 and the data collector C6 as the radius intersect at one point, and the sensor S1 is located right at the intersecting point, therefore solving theses above three equations can thus give rise to the coordinates of the sensor S1.

It is noted that the coordinates of the sensor can also be determined based on the distance between each sensor and each of the at least three data collectors and the coordinates of each of the at least three data collectors by means of other calculation approaches. There are no limitations herein.

In the aforementioned wireless positioning apparatus according to some embodiments of the present disclosure, the data processor can be configured to determine the coordinates of each sensor repeatedly, and an average value of the coordinates of each sensor that have been determined repeatedly can be configured as the coordinates of the sensor.

For example, the three data collectors C1, C2 and C6 can be selected to thereby calculate the coordinates $(X_1, Y_1)$ of the sensor S1, the three data collectors C1, C6 and C7 can be selected to calculate the coordinates $(X_2, Y_2)$ of the sensor S1, the three data collector C2, C6 and C7 can be selected to calculate the coordinates $(X_3, Y_3)$ of the sensor S1, and the average value of the coordinates of the sensor S1 that have been obtained by these three sets of the data collectors can be calculated as the coordinates $$\left(\frac{X_1 + X_2 + X_3}{3}, \frac{Y_1 + Y_2 + Y_3}{3}\right),$$

which can be configured to be the coordinates of the sensor S1. As such, the errors in calculating the coordinate of each sensor can be effectively reduced.

In some embodiments of the wireless positioning apparatus, a bluetooth communication can be configured as the mode of communication between each sensor and each data collector, i.e., each sensor can specifically be configured to transmit a bluetooth signal to each data collector, and each data collector can specifically be configured to collect a strength of the bluetooth signal sent by each sensor.

According to the bluetooth communication protocol, each main bluetooth device can communicate with at most seven bluetooth devices. Because different types of sports may involve a different number of players in the field, thus in implementing the wireless positioning apparatus for the positioning of each play wearing a sensor capable of transmitting the bluetooth signal, the number of data collectors capable of collecting a strength of the bluetooth signal sent by each sensor that are required can be determined depending on the actual number of the players wearing sensors in the sports field.

It should be noted that besides bluetooth communication, other types of a wireless communication can also be configured for communications between each sensor and each data collector. There are no limitations herein.

In the wireless positioning apparatus according to some embodiments of the present disclosure, each sensor can be configured to send a bluetooth signal to each data collector by bluetooth broadcasting. As such, each data collector receiving the bluetooth broadcasting can collect bluetooth signals sent by each of the sensors, thereby the communication between each sensor and each data collector can be simplified and the communication efficiency between each sensor and each data collector can also be improved.

In implementations, in the wireless positioning apparatus as described above, each sensor can be configured to send a bluetooth signal to each data collector at a time interval of 0.1 s. Specifically, the time interval of each sensor sending bluetooth signals to each data collector can be adjusted according to actual situations and practical needs. Each sensor can also be configured to send bluetooth signals to each data collector in a real-time manner. There are no limitations herein.

In some embodiments of the wireless positioning apparatus, the communication among data collectors and the communication between each of the data collectors and the data processor can be through a mode of WI-FI.

In a second aspect, the present disclosure further provides a sports training apparatus, which comprises a wireless positioning apparatus according to any of embodiments as described above. The implementation of the sports training apparatus is similar to the implementation of the embodiments of the wireless positioning apparatus, and the technical description of the working principle is skipped herein.

In some embodiments of the sports training apparatus, the sensor can be a wearable device worn on the body of an athletic, and the wearable device can be in a form a bracelet, a ring, clothing, etc., which can avoid the impacts of the sensor on the movement of the athletics in the training process.

In some embodiments of the sports training apparatus, each athletic can wear a single one sensor. In some other embodiments, each athletic can wear a plurality of sensors, among which one sensor can be configured to position the athletic. There are no limitations herein.

During specific implementation of the sports training apparatus as described above, the data processor can be further configured, based on the coordinates of each athletic, to determine one or more of the following parameters of the athletic: an instant speed, an average speed, a maximum speed, a number of sprints, and a first movement distance within a preselected time interval. As such, a coach can analyze each athletic based on these parameters that have been determined, which thereby can allow the coach to provide personalized guidance and training to each individual athletic.

For example, a first movement distance $L_1$ within a preselected time interval T can be determined for an athletic wearing the sensor S1. Based on the coordinates (X,Y) of the athletic, a movement track of the athletic can be represented as a function:

$$Q = F(S[X, Y], t)$$

Then by integrating this function, the first movement distance of the athletic within the preselected time interval T can be thus obtained by the following formula:

$$L_1 = \int_0^T F(S[X, Y], t) dt$$

In some embodiments of the sports training apparatus, each sensor can further be configured to determine a number of steps that an athletic wearing the sensor moves within a preselected time interval, and then to send the number of steps to each data collector. Each data collector can further be configured to collect the number of steps sent by each sensor, and then to send the number of steps to the data processor.

The data processor can further be configured to receive the number of steps of each athletic wearing the sensor sent from each data collector, and then to determine a second movement distance of each athletic within the preselected time interval based on the number of steps that have been received and an average step distance of the each athletic.

The first movement distance and the second movement distance of each athletic within the time interval can be further compared to thereby calibrate the pre-stored environment calibration parameter. As such, the accuracy of the environment calibration parameter $K_{nm}$ for the sensor and data collector pair including the $n^{th}$ sensor and the $m^{th}$ data collector can be improved, and the accuracy of the distance between the $n^{th}$ sensor and the $m^{th}$ data collector can be further improved.

For example, the sensor S1 determines that the number of steps an athletic wearing the sensor S1 moves within the preselected time interval T is N. The sensor S1 then sends the number of steps N the athletic moves within the time interval T to the data collector C1. The data collector C1 in turn sends the number of steps N within the time interval T to the data processor.

The data processor can then base on the number of steps N within the time interval T and the average stride distance M of the athletic to determine that the second movement distance of the athletic $L_2=N\times M$ within the preselected time interval T. By comparing the first movement distance $L_1$ and the second movement distance $L_2$ of the athletic within the preselected time interval T, the pre-stored environment calibration parameter $K_{11}$ can be further adjusted.

In a third aspect, the present disclosure provides a wireless positioning method utilizing the wireless positioning apparatus as described above, which can be employed for positioning at least one moving object in a field. Herein the moving object can be a human, but can also be an animal, or a non-living object such as a machine, or a robot.

Figure 5:
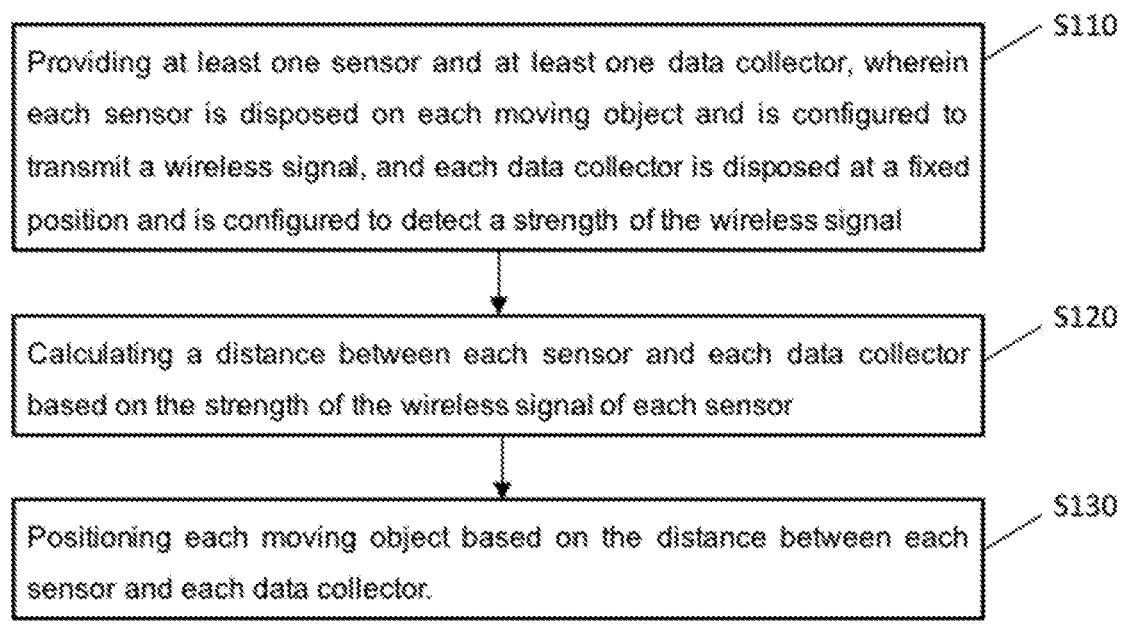
FIG. 5 is a flow chart of a wireless positioning method according to some embodiments of the present disclosure.

As illustrated by the flow chart in FIG. 5, the wireless positioning method includes the following steps:

S110: providing at least one sensor and at least one data collector, wherein each sensor is disposed on each moving object and is configured to transmit a wireless signal, and each data collector is disposed at a fixed position and is configured to detect a strength of the wireless signal;

S120: calculating a distance between each sensor and each data collector based on the strength of the wireless signal of each sensor; and S130: positioning each moving object based on the distance between each sensor and each data collector.

In some embodiments of the wireless positioning method, the step of calculating a distance between each sensor and each data collector based on the strength of the wireless signal of each sensor (i.e., S120) is based on formula:

$$D_{nm} = 10^{\frac{|RSSI_{nm}|-A_{nm}}{10\times K_{nm}}};$$

wherein $D_{nm}$ represents a distance between $n^{th}$ sensor and $m^{th}$ data collector; $RSSI_{nm}$ represents a strength of a wireless signal of the $n^{th}$ sensor detected by the $m^{th}$ data collector; $A_{nm}$ represents a strength of a wireless signal of the $n^{th}$ sensor detected by the $m^{th}$ data collector at a preselected distance between the $n^{th}$ sensor and the $m^{th}$ data collector; and $K_{nm}$ represents an environment calibration parameter for a sensor and data collector pair including the $m^{th}$ data collector and the $n^{th}$ sensor.

According to some embodiments, prior to the step of calculating a distance between each sensor and each data collector based on the strength of the wireless signal of each sensor (i.e., S120), the wireless positioning further includes a step of:

determining an environment calibration parameter for each sensor and data collector pair including each data collector and each sensor.

Herein the above step of determining an environment calibration parameter for each sensor and data collector pair can include the following sub-steps:

disposing each sensor at a preselected position;
detecting a strength of a wireless signal of each first device detected by each data collector; and
calculating a first environment calibration parameter for each first device and data collector pair by formula:

$$K_{nm} = \frac{|RSSI_{nm}|-A_{nm}}{10\times lg d_{nm}};$$

wherein $d_{nm}$ represents a distance between the $n^{th}$ sensor and the $m^{th}$ data collector when the $n^{th}$ sensor is disposed at the preselected position; $RSSI_{nm}$ represents a strength of a wireless signal of the $n^{th}$ sensor detected by the $m^{th}$ data collector at the distance of $d_{nm}$ between the $n^{th}$ sensor and the $m^{th}$ data collector; $A_{nm}$ represents a strength of a wireless signal of the $n^{th}$ sensor detected by the $m^{th}$ data collector at the preselected distance between the $n^{th}$ sensor and the $m^{th}$ data collector.

In some embodiments of the wireless positioning method, the step of determining an environment calibration parameter for each sensor and data collector pair can further include the following sub-steps:

disposing each sensor at at least one second preselected position, detecting a strength of a wireless signal of each sensor disposed at each of the at least one second preselected position that is detected by each data collector, and calculating at least one second environment calibration parameter for each sensor and data collector pair; and calculating an average value of the first environment calibration parameter and the at least one second environment calibration parameter to thereby obtain the environment calibration parameter.

In the wireless positioning method, the at least one data collector can include a first set of three data collectors. Accordingly, the step of positioning each of the at least one moving object based on the distance between each sensor and each data collector includes the following sub-step:

determining first coordinates of the each of the at least one moving object based on a distance calculated between each sensor and each data collector in the first set.

In the wireless positioning method as described above, the at least one data collector can additionally include at least one second set of three data collectors. Accordingly, the step of positioning each of the at least one moving object based on the distance between each sensor and each data collector further includes the following sub-steps:

determining at least one second coordinates of the each of the at least one moving object based on a distance calculated between each sensor and each data collector in each of the at least one second set of three data collectors; and calculating an average value of the first coordinates and the at least one second coordinates to thereby obtain a position of the each of the at least one moving object.

In some embodiments of the wireless positioning method, the at least one moving object can include at least one human, and accordingly the wireless positioning method further includes the following steps:

calculating a first movement distance of each of the at least one human within a preselected time interval by formula: $L_1=\int_0^T F(S[X,Y],t)dt$, wherein $L_1$ represents a first movement distance of one human; S[X, Y] represents coordinates of the one human; F(S[X, Y], t) represents a function of a movement track of the one human; and T represents the preselected time interval;

calculating a second movement distance of each of the at least one human within a preselected time interval by formula: $L_2=N\times M$, wherein $L_2$ represents a second movement distance of one human; N represents a number of steps the one human moves within the preselected time interval T; and M represents an average stride distance of the one human; and adjusting the environment calibration parameter for each sensor and data collector pair by comparing the first movement distance and the second movement distance of each of the at least one human.

Furthermore in any embodiment of the wireless positioning apparatus as described above, the wireless signal can be a bluetooth signal.

In these above-mentioned embodiments of the wireless positioning apparatus, each sensor is configured to transmit a wireless signal via a mode of bluetooth broadcasting.

In summary, the present disclosure provides a wireless positioning apparatus and method, and a sports training apparatus.

The wireless positioning apparatus comprises a data processor, at least one data collector, and at least one sensor; each sensor is configured to send a wireless signal to each data collector; each data collector is configured to collect a strength of the wireless signal sent by each sensor, and to send the strength of the wireless signal of each sensor to the data processor; the data processor is configured to receive the strength of the wireless signal of each sensor sent by each data collector, and to calculate a distance between each sensor and each data collector based on the strength of the wireless signal of each sensor, and to position each sensor based on the distance between each sensor and each data collector.

As such, when the wireless positioning apparatus is utilized in the sports field, each athletic can wear a sensor to realize a real-time positioning of each athletic, thereby the movement characteristics of each athletic can be determined, and a refined management of each athletic can be further achieved.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A wireless positioning apparatus for positioning at least one moving object, comprising at least one first device and at least one second device, wherein:

each of the at least one first device is disposed on each of the at least one moving object and is configured to transmit a wireless signal; and each of the at least one second device is disposed on a fixed position and is configured to detect a strength of the wireless signal of each first device such that a position of the each of the at least one moving object can be determined based on the strength of the wireless signal of each first device detected by each second device, the apparatus further comprising a data processor, wherein the data processor is configured to:

receive the strength of the wireless signal of each first device from each second device; to calculate a distance between each first device and each second device based on the strength of the wireless signal of each first device detected by each second device;

determine a position of each first device based on the distance between each first device and each second device to thereby position the each of the at least one moving object; and calculate a distance between each first device and each second device based on formula:

$$D_{nm} = 10^{\frac{|RSSI_{nm}|-A_{nm}}{10\times K_{nm}}};$$

wherein $D_{nm}$ represents a distance between $n^{th}$ first device and $m^{th}$ second device; $RSSI_{nm}$ represents a strength of a wireless signal of the $n^{th}$ first device detected by the $m^{th}$ second device; $A_{nm}$ represents a strength of a wireless signal of the $n^{th}$ first device detected by the $m^{th}$ second device at a preselected distance between the $n^{th}$ first device and the $m^{th}$ second device; and $K_{nm}$ represents an environment calibration parameter for a first device and second device pair including the $m^{th}$ second device and the $n^{th}$ first device.

2. The wireless positioning apparatus of claim 1, wherein the data processor is configured to store an environment calibration parameter for each first device and second device pair including each second device and each first device, calculated by formula:

$$K_{nm} = \frac{|RSSI_{nm}|-A_{nm}}{10\times lgd_{nm}};$$

wherein $d_{nm}$ represents a distance between the $n^{th}$ first device and the $m^{th}$ second device when the $n^{th}$ first device is disposed at the preselected position; $RSSI_{nm}$ represents a strength of a wireless signal of the $n^{th}$ first device detected by the $m^{th}$ second device at the distance of $d_{nm}$ between the $n^{th}$ first device and the $m^{th}$ second device; $A_{nm}$ represents a strength of a wireless signal of the $n^{th}$ first device detected by the $m^{th}$ second device at the preselected distance between the $n^{th}$ first device and the $m^{th}$ second device.

3. The wireless positioning apparatus of claim 1, wherein:

each of the at least one first device is configured to transmit a bluetooth signal; and each of the at least one second device is configured to detect a strength of the bluetooth signal.

4. The wireless positioning apparatus of claim 3, wherein each of the at least one first device is configured to transmit a bluetooth signal via a mode of bluetooth broadcasting.

5. The wireless positioning apparatus of claim 1, wherein the data processor is configured to receive the strength of the wireless signal of each first device from each second device via a mode of WI-FI.

6. A method for positioning at least one moving object, comprising:
    providing at least one first device disposed on each of the at least one moving object and transmitting a wireless signal, and at least one second device disposed at a fixed position and detecting a strength of the wireless signal of each first device;
    calculating a distance between each first device and each second device based on the strength of the wireless signal of each first device; and
    positioning each of the at least one moving object based on the distance between each first device and each second device;
    wherein the calculating a distance between each first device and each second device based on the strength of the wireless signal of each first device is based on formula:

$$D_{nm} = 10^{\frac{|RSSI_{nm}| - A_{nm}}{10 \times K_{nm}}};$$

wherein $D_{nm}$ represents a distance between $n^{th}$ first device and $m^{th}$ second device; $RSSI_{nm}$ represents a strength of a wireless signal of the $n^{th}$ first device detected by the $m^{th}$ second device; $A_{nm}$ represents a strength of a wireless signal of the $n^{th}$ first device detected by the $m^{th}$ second device at a preselected distance between the $n^{th}$ first device and the $m^{th}$ second device; and $K_{nm}$ represents an environment calibration parameter for a first device and second device pair including the $m^{th}$ second device and the $n^{th}$ first device.

7. The method of claim 6, further comprising, prior to the calculating a distance between each first device and each second device based on the strength of the wireless signal of each first device:
    determining an environment calibration parameter for each first device and second device pair including each second device and each first device, comprising:
    disposing each first device at a preselected position;
    detecting a strength of a wireless signal of each first device detected by each second device; and
    calculating a first environment calibration parameter for each first device and second device pair by formula:

$$K_{nm} = \frac{|RSSI_{nm}| - A_{nm}}{10 \times lg d_{nm}};$$

wherein $d_{nm}$ represents a distance between the $n^{th}$ first device and the $m^{th}$ second device when the $n^{th}$ first device is disposed at the preselected position; $RSSI_{nm}$ represents a strength of a wireless signal of the $n^{th}$ first device detected by the $m^{th}$ second device at the distance of $d_{nm}$ between the $n^{th}$ first device and the $m^{th}$ second device; $A_{nm}$ represents a strength of a wireless signal of the $n^{th}$ first device detected by the $m^{th}$ second device at the preselected distance between the $n^{th}$ first device and the $m^{th}$ second device.

8. The method of claim 7, wherein the determining an environment calibration parameter for each first device and second device pair including each second device and each first device further comprises:
    disposing each first device at at least one second preselected position, detecting a strength of a wireless signal of each first device disposed at each of the at least one second preselected position that is detected by each second device, and calculating at least one second environment calibration parameter for each first device and second device pair; and
    calculating an average value of the first environment calibration parameter and the at least one second environment calibration parameter to thereby obtain the environment calibration parameter.

9. The method of claim 6, wherein the at least one second device comprises a first set of three second devices, and the positioning each of the at least one moving object based on the distance between each first device and each second device comprises:
    determining first coordinates of the each of the at least one moving object based on a distance calculated between each first device and each second device in the first set of three second devices.

10. The method of claim 9, wherein the at least one second device further comprises at least one second set of three second devices, and the positioning each of the at least one moving object based on the distance between each first device and each second device further comprises:
    determining at least one second coordinates of the each of the at least one moving object based on a distance calculated between each first device and each second device in each of the at least one second set of three second devices; and
    calculating an average value of the first coordinates and the at least one second coordinates to thereby obtain a position of the each of the at least one moving object.

11. The method of claim 6, wherein the wireless signal is a bluetooth signal.

12. The method of claim 11, wherein each first device transmits a wireless signal via a mode of bluetooth broadcasting.

13. The method of claim 8, wherein the at least one moving object comprises at least one human, and the method further comprises:
    calculating a first movement distance of each of the at least one human within a preselected time interval by formula: $L_1 = \int_0^T F(S[X,Y],t)dt$, wherein $L_1$ represents a first movement distance of one human; $S[X, Y]$ represents coordinates of the one human; $F(S[X, Y], t)$ represents a function of a movement track of the one human; and T represents the preselected time interval;
    calculating a second movement distance of each of the at least one human within a preselected time interval by formula: $L_2 = N \times M$, wherein $L_2$ represents a second movement distance of one human; N represents a number of steps the one human moves within the preselected time interval T; and M represents an average stride distance of the one human; and
    adjusting the environment calibration parameter for each first device and second device pair by comparing the first movement distance and the second movement distance of each of the at least one human.

14. A sports training apparatus, comprising a data processor, and a wireless positioning apparatus for positioning at least one user, the wireless positioning apparatus comprising at least one first device and at least one second device, wherein:
    each of the at least one first device is disposed on each of the at least one user and is configured to transmit a wireless signal;

each of the at least one second device is disposed on a fixed position and is configured to detect a strength of the wireless signal of each first device such that a position of the each of the at least one moving object can be determined based on the strength of the wireless signal of each first device detected by each second device;

each of the at least one first device is further configured to measure a number of steps of the user within the preselected time interval;

each of the at least one second device is further configured to receive, and send to the data processor, the number of steps within the preselected time interval sent by each first device;

the data processor is further configured to determine a second movement distance within the preselected time interval based on the number of steps within the preselected time interval and an average stride distance, and to adjust the environment calibration parameter for each of the at least one first device and second device pair including each of the at least one second device and each of the at least one first device by comparing the first movement distance and the second movement distance.

15. The sports training apparatus of claim 14, wherein each of at least one first device is a wearable device worn on a body of a user.

16. The sports training apparatus of claim 15, wherein the data processor is further configured to determine at least one of an instant speed, an average speed, a maximum speed, a number of sprints, and a first movement distance within a preselected time interval, of the user.

* * * * *